United States Patent [19]

Sakuma et al.

[11] Patent Number: 4,932,734
[45] Date of Patent: Jun. 12, 1990

[54] OPTICAL SCANNING SYSTEM USING A LASER DIODE ARRAY

[75] Inventors: Nobuo Sakuma, Inagi; Kenichi Takanashi, Yokohama, both of Japan

[73] Assignee: Ricoh Company, Ltd., Tokyo, Japan

[21] Appl. No.: 280,549

[22] Filed: Dec. 6, 1988

[30] Foreign Application Priority Data

Dec. 11, 1987 [JP] Japan .................. 62-313491
Dec. 18, 1987 [JP] Japan .................. 62-320384
Nov. 18, 1988 [JP] Japan .................. 63-292131

[51] Int. Cl.$^5$ ............................................. G02B 26/10
[52] U.S. Cl. ................................ 350/6.8; 350/6.1; 350/469; 250/578.1
[58] Field of Search ............... 350/6.8, 6.7, 6.6, 6.5, 350/6.1, 6.9, 6.91, 469, 478; 250/236, 578; 358/285

[56] References Cited

U.S. PATENT DOCUMENTS 4,253,724 3/1981 Minoura et al. ............... 350/6.8
4,850,663 7/1989 Yamamoto et al. ............ 350/6.8

FOREIGN PATENT DOCUMENTS 56-69610 6/1981 Japan .
56-69611 6/1981 Japan .
57-22218 2/1982 Japan .
58-184117 10/1983 Japan .

Primary Examiner—Bruce Y. Arnold
Assistant Examiner—Loha Ben
Attorney, Agent, or Firm—Cooper & Dunham

[57] ABSTRACT

An optical scanning system using a laser diode array includes a collimator lens, a first imaging optical system being afocal in a deflection plane for imaging a plurality of beams from the collimator lens into respective lines in a plane perpendicular to the deflection plane, a deflector having a deflection/reflection surface, for deflecting beams from the first imaging optical system, and a second imaging optical system for focusing beams from the deflector on a scanned surface. The first imaging optical system includes, in the following order from the side of the collimator lens toward the deflector, a first spherical lens having a positive refracting power, a first cylindrical lens having a positive refracting power in the plane perpendicular to the deflection plane and a lens surface having a curvature opposite to the collimator lens, a second cylindrical lens having a negative refracting power in the plane perpendicular to the deflection plane and a lens surface having a curvature opposite to the collimator lens, and a second spherical lens having a positive refracting power.

6 Claims, 6 Drawing Sheets

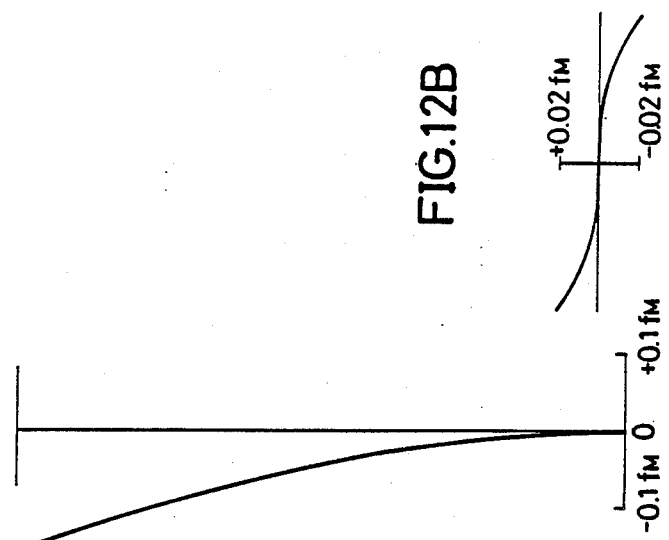
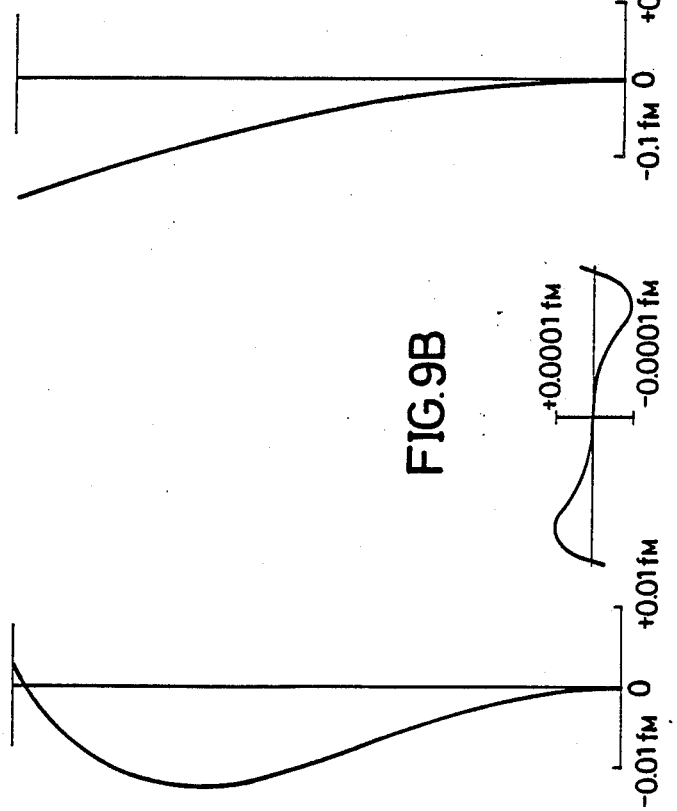

FIG.10
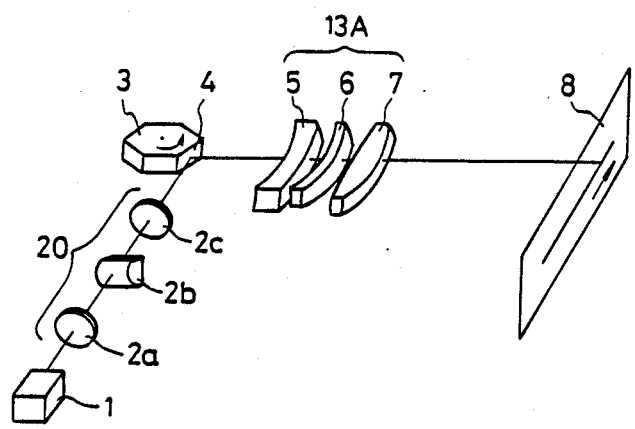
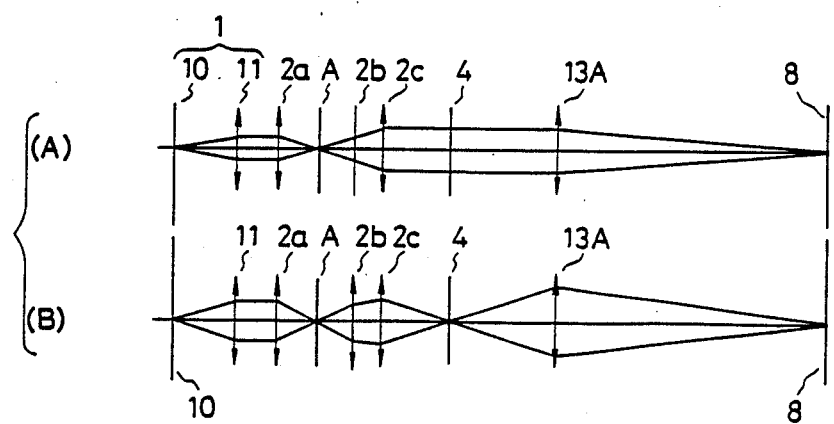
FIG.11

OPTICAL SCANNING SYSTEM USING A LASER DIODE ARRAY

BACKGROUND OF THE INVENTION

The present invention relates to an optical scanning system using a laser diode array.

As is well known, a laser diode array is used as a light source in which a plurality of semiconductor laser diodes are integrally formed so that light-emitting portions thereof are array-arranged. Recently, a scanning method has been proposed in which a plurality of image lines on a surface of a recording medium are scanned at one time by simultaneously deflecting a plurality of luminous fluxes (beams) emitted from the above-mentioned light source. By this scanning method, it becomes substantially possible to obtain an increased scanning speed.

FIG. 1 is a view showing an example of a laser diode array. An illustrated laser diode array LDA is made up of two light-emitting portions spaced at a distance L. The light-emitting portions emit elliptical beams B1 and B2 each having the major axis in a direction perpendicular to a heterodyne interface 9. Each of the elliptical beams B1 and B2 has a divergence of an approximately 30° width in the major axis for the energy mesial magnitude, and a divergence of an approximately 10° width in a minor axis for the energy mesial magnitude. The minor-axis is a direction parallel to the heterodyne interface 9. Generally, there is a limitation of approximately 0.1 mm on the distance L between the light-emitting portions.

FIG. 2 is a view illustrating a state where two beams emitted from the laser diode array LDA are focused so as to form spots SP1 and SP2 on a surface to be scanned. By deflecting two beams at the same time, it becomes possible to simultaneously scan lines $ln_1$ and $ln_2$ by the spots SP1 and SP2, respectively. As described before, the distance L between the light-emitting portions has a limitation of approximately 0.1 mm, and it is impossible to obtain the distance L shorter than the above limitation. When the distance L is actually set equal to an interval Ps between the lines $ln_1$ and $ln_2$, the interval Ps becomes too large. For this reason, a method as shown in FIG. 3 has been proposed in which the heterodyne interface 9 of the laser diode array LDA is inclined at a fine angle $\theta$ with respect to a main scanning direction MS so that a distance $P_{LS}$ becomes equal to the line interval Ps shown in FIG. 2. The above is disclosed in a Japanese Laid-Open Patent Application No. 56-69611, for example. Therefore, the spots SP1 and SP2 are spaced at a distance $P_M$ in the main scanning direction MS, corresponding to a length of L cos $\theta$.

FIG. 4 is a view which simply shows a conventional optical scanning system. FIG. 4(A) shows a state obtained by expanding an optical path extending from a light source 10 to the scanned surface 8, to a single plane. The up/down direction of FIG. 4(A) corresponds to the main scanning direction MS in the scanned plane. Hereinafter, the up/down direction in FIG. 4(A) is simply referred to as the main scanning direction. FIG. 4(A) also shows a state of beams on a plane which the beams deflected by a deflection/reflection surface 4 of a deflector scan, or "a deflector plane". On the other hand, FIG. 4(B) shows a state obtained by expanding the conventional optical scanning system to a single plane along the above-mentioned optical path. The plane of FIG. 4(B) is a plane which includes the optical path and is perpendicular to the above-mentioned deflection plane. Hereinafter, this plane is simply referred to as "a plane perpendicular to the deflection plane". In FIG. 4(B) showing a deflection plane, the up/down direction corresponds to a sub scanning direction. Hereinafter, this up/down direction is referred to as a sub scanning direction.

Divergent beams emitted from the light source 10 are altered to parallel luminous fluxes by a collimator part 11, and then, due to the function of a cylindrical lens 12, form respective line images in the main scanning direction in the vicinity of the deflection/reflection surface 4 in the plane perpendicular to the deflection plane. An imaging lens 13 is an anamorphic lens, and focuses the parallel luminous fluxes on the scanned surface 8 in the main scanning direction. On the other hand, in the sub scanning direction, or in other words, the plane perpendicular to the deflection plane, the imaging lens 13 couples the position of the deflection/reflection surface 4 with the scanned surface 8 so that a nearly conjugate relationship is established therebetween. As a result, each beam is imaged in the shape of a spot on the scanned surface 8.

However, the conventional scanning system having the laser diode array LDA has the following disadvantages.

As described previously, the divergent angle of each beam emitted from the laser diode array LDA is large in the direction perpendicular to the heterodyne interface 9. Therefore, by collimating the two beams B1 and B2 by the collimator part 11, the flux diameter of each collimated beam becomes large in the direction perpendicular to the heterodyne interface 9 in cases except that the numerical aperture of the collimator part 11 is extremely small.

As described previously, the laser diode array LDA is arranged in such a manner that the heterodyne interface 9 thereof is kept inclined at an angle $\theta$ with respect to the main scanning direction. In this case, the angle $\theta$ is set very small. Therefore, each of the collimated beams is thin in the main scanning direction, and is thick in the sub scanning direction. As a result, when the above-mentioned beams are imaged on the scanned surface 8 by using the optical scanning system of FIG. 4, it is difficult to obtain a desired shape of each imaged spot such as the spots SP1 and SP2 shown in FIG. 2 in which it is slightly longer in the sub scanning direction than in the main scanning direction. That is, although the width of an imaged spot in the sub scanning direction is adjustable by using the cylindrical lens 12, the width thereof in the main scanning direction is necessarily determined by the collimator part 11.

As a result, it is necessary to design the collimator part 11, depending on the width of an imaged spot in the main scanning direction. In cases when a desired spot width is not obtained in the assembled optical scanning system, there is no way except for an exchange of the collimator part 11 in order to obtain a desired spot shape. This increases cost.

SUMMARY OF THE INVENTION

It is therefore a general object of the present application to provide a novel and useful optical scanning system using a laser diode array.

A more specific object of the present invention is to provide an optical scanning system using a laser diode array, capable of certainly providing a desired image spot with ease.

The above objects of the present invention can be achieved by an optical scanning system using a laser diode array, including a collimator lens for collimating a plurality of beams emitted from a laser diode array; a first imaging optical system being afocal in a deflection plane for imaging the beams emitted from the collimator lens into respective lines in a plane perpendicular to the deflection plane; a deflector having a deflection/reflection surface, for deflecting beams from the first imaging optical system; and a second imaging optical system for focusing beams from the deflector on a scanned surface. The first imaging optical system comprises, in the following order from the side of said collimator lens toward the deflector, a first spherical lens having a positive refracting power; a first cylindrical lens having a positive refracting power in the plane perpendicular to the deflection plane and a lens surface having a curvature opposite to the collimator lens; a second cylindrical lens having a negative refracting power in the plane perpendicular to the deflection plane and a lens surface having a curvature opposite to the collimator lens; and a second spherical lens having a positive refracting power.

The above-mentioned objects of the present invention can be also achieved by substituting the above-mentioned first imaging optical system with another imaging optical system including, in the following order from the side of the collimator lens toward the deflector, a first spherical lens having a positive refracting power; a cylindrical lens having a positive refracting power in the plane perpendicular to the deflection plane; and a second spherical lens having a positive refracting power.

Other objects, features and advantages of the present invention will become apparent from the following detailed description when read in conjunction with the accompanying drawings.

BRIEF DESCRIPTION OF THE DRAWINGS

FIGS. 9A and 9B show a spherical aberration curve and a coma aberration curve respectively, in the sub scanning direction with respect to the second imaging optical system 13A having dimensions shown in TABLE 1 in a case when the first imaging optical system 2 having dimensions shown in TABLE 3;

FIG. 10 is a perspective view of another preferred embodiment of the present invention;

FIG. 11 is a simplified view for explaining an optical scanning system of the embodiment of FIG. 10; and FIGS. 12A and 12B show a spherical aberration curve and a coma aberration curve respectively, in the sub scanning direction with respect to a first imaging optical system 20 having dimensions shown in TABLE 2.

DETAILED DESCRIPTION

Figure 5:
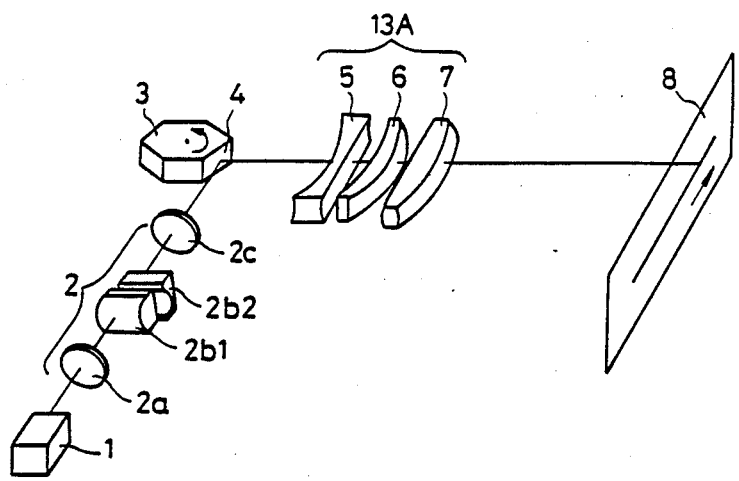
FIG. 5 is a perspective view of a preferred embodiment of the present invention.
Figure 6:
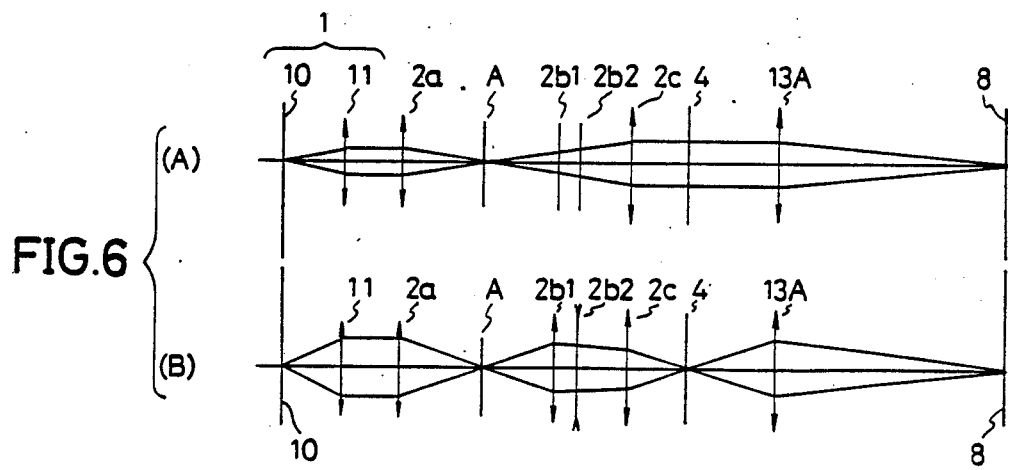
FIG. 6 is a simplified view for explaining an optical scanning system of the embodiment of FIG. 5.

A description is given of a preferable embodiment of the present invention with reference to FIGS. 5 and 6.

Figure 1:
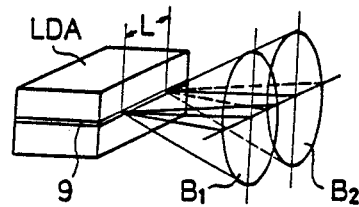
FIG. 1 is a perspective view of an example of a laser diode array.
Figure 2:
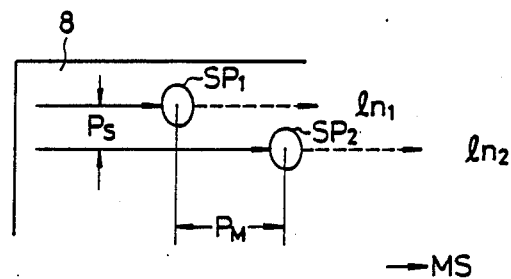
FIG. 2 is a view illustrating a state where two beams emitted from the laser diode array of FIG. 1 are imaged as spots SP1 and SP2 on a scanned surface.
Figure 3:
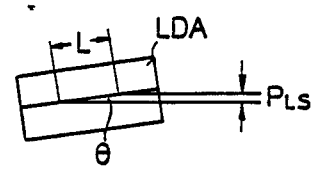
FIG. 3 is a view illustrating positioning of the laser diode array with respect to a main scanning direction.
Figure 4:
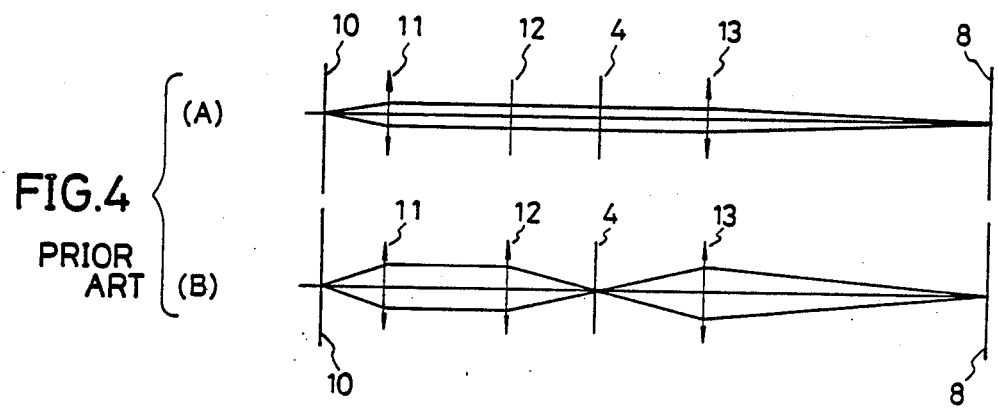
FIG. 4 is a simplified view showing conventional optical scanning system using a laser diode array.

Referring to FIG. 5, a light source 1 is made up of the laser diode array LDA shown in FIG. 1 and a collimator lens 11 corresponding to the aforementioned collimator part 11. The laser diode array LDA of the light source 1 is arranged so that as shown in FIG. 3, the heterodyne interface 9 thereof is inclined at a fine angle $\theta$ with respect to the main scanning direction.

A first imaging optical system 2 includes spherical lenses 2a and 2c each having a positive refracting power, and first and second cylindrical lenses 2b1 and 2b2 interposed therebetween. The first cylindrical lens 2b1 has a positive refracting power in the plane perpendicular to the deflection plane as defined previously. The second cylindrical lens 2b2 has a negative refracting power in the plane perpendicular to the deflection plane. Both the first and second cylindrical lenses 2b1 and 2b2 have incident surfaces (facing the collimator lens 11 of the light source 1) each having a curvature, and exit surfaces of flat surfaces.

A rotary polygon mirror 3 is served as a deflector.

A second imaging optical system 13A is made up of an anamorphic single-lens 5, a spherical single-lens 6 having a positive refracting power, and an anamorphic single-lens 7 having a toric surface.

FIG. 6 illustrates beams in the optical scanning system of FIG. 5. FIG. 6(A) shows the deflection plane, and FIG. 6(B) shows the plane perpendicular to the deflection plane. A reference numeral 10 indicates a plane on which the laser diode array LDA of the light source 1 is arranged.

Due to the function of the spherical lens 2a in the first imaging optical system 2, two parallel beams emitted from the light source 1 are once imaged at a position indicated by A in both the main and sub scanning directions. Then in the sub scanning direction, each imaged spot at the position A is imaged in the vicinity of the deflection/reflection surface 4 of the rotary polygon mirror 3, due to the function of the cylindrical lenses 2b1 and 2b2, and the spherical lens 2c. On the other hand, both the cylindrical lenses 2b1 and 2b2 have refracting powers in the plane perpendicular to the deflection plane, but do not have refracting powers in the deflection plane. Therefore, the beams from the first imaging optical system 2 are parallel beams in the main scanning direction. As a result, an image of each beam formed by the first imaging optical system 2 is a line image parallel to the main scanning direction. That is, the first imaging optical system 2 is afocal in the deflection plane, and images the luminous flux from the collimator lens 11 into a line in the plane perpendicular to the deflection plane. At this time, there is no conjugate relationship between an exit pupil surface of the collimator lens 11 and the deflection/reflection surface 4 of the rotary polygon mirror 3.

The first imaging optical system 2 is afocal in the deflection plane. Therefore, the spherical lenses 2a and 2c function as a beam expander system in the deflection plane. Therefore, it becomes possible to obtain a desired spot width by selecting a beam expansion ratio of the beam expander system, depending on a spot width of each beam in the main scanning direction.

Further, the first imaging optical system 2 has the cylindrical lenses 2b1 and 2b2 each having a positive refracting power in the deflection plane. Therefore, by shifting the cylindrical lenses 2b1 and 2b2 in the optical axis, it becomes possible to adjust the spot diameter in the sub scanning direction. Moreover, by shifting at least one of the spherical lenses 2a and 2c, it becomes possible to adjust the spot diameter in the main scanning direction.

In FIG. 6, the second imaging optical system 13A is simply illustrated. The second imaging optical system 13A images each beam deflected by the rotary polygon mirror 3 on the scanned surface 8. That is, the second imaging optical system 13A couples, in the plane perpendicular to the deflection plane, the position of the deflection/reflection surface 4 with the scanned surface 8, with a nearly conjugate relationship. On the other hand, in the deflection plane, the second imaging optical system 13A focuses the parallel beams on the scanned surface 8. As a result, positional errors of each deflection/reflection surface of the rotary polygon mirror 3 with respect to the rotary shaft (axis) thereof can be effectively compensated. That is, in cases where deflection/reflection surfaces are not parallel to the rotary shaft, pitches between neighboring lines change. By using the above-mentioned optical scanning system, a fixed pitch is obtainable. It is noted that the second imaging optical system 13A is so-called an $f\theta$ lens, which enables a fixed-speed optical scan.

An example of dimensions of the second imaging optical system 13A is shown in TABLE 1:

TABLE 1

| | | | | | | |
|---|---|---|---|---|---|---|
| $r_1$ | −20.286 | $r_1'$ | −20.286 | $d_1$ 2.229 | | $n_1$ 1.51118 |
| $r_2$ | ∞ | $r_2'$ | 7.58 | $d_2$ 2.214 | | |
| $r_3$ | −60.785 | $r_3'$ | −60.785 | $d_3$ 2.972 | | $n_2$ 1.51118 |
| $r_4$ | −30.838 | $r_4'$ | −30.838 | $d_4$ 0.892 | | |
| $r_5$ | ∞ | $r_5'$ | ∞ | $d_5$ 3.626 | | $n_3$ 1.76605 |
| $r_6$ | −36.709 | $r_6'$ | −10.061 | | | |
| $f_m = 100$, $f_S = 21.011$, $d_0 = 12.187$, $\beta = -4.036$ | | | | | | |

In TABLE 1, $r_1$–$r_6$ are radii of curvatures of lens surfaces of the second imaging optical system 13A in the main scanning direction which appear in order from the side of the deflection/reflection surface 4, and $r_1'$–$r_6'$ are radii of curvatures of the lens surfaces thereof in the sub scanning direction which appear in order from the side of the deflection/reflection surface 4. Further, $d_1$–$d_5$ are surface-to-surface distances which appear in order from the side of the deflection/reflection surface 4, and $n_1$–$n_3$ are refractive indexes of lenses which appear in order from the side of the deflection/reflection surface 4 (for 780 nm of a light-emitting wavelength of the laser diode array LDA). Moreover, $f_M$ and $f_S$ are focal lengths of the second imaging optical system 13A in the main and sub scanning directions, respectively. Furthermore, $\beta$ is a lateral magnification in the nearly conjugate relationship between the deflection/reflection surface 4 and the scanned surface 8 in the sub scanning direction, and $d_0$ is a distance between the deflection/reflection surface 4 and the lens surface of the single lens 5 opposite to the polygon mirror 3.

Figures 7A, 7B:
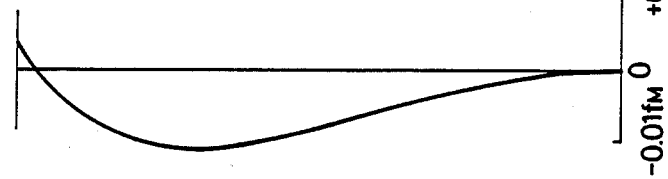
FIGS. 7A and 7B show a spherical aberration curve and a coma aberration curve respectively, in the sub scanning direction with respect to a second imaging optical system 13A having dimensions shown in TABLE 1.

FIGS. 7A and 7B show a spherical aberration curve and a coma aberration curve, respectively, in the sub scanning direction with respect to the second imaging optical system 13A having the above-mentioned dimensions. In FIG. 7A, the vertical axis represents a field angle, and the horizontal axis represents a degree of the spherical aberration. In FIG. 7B, the vertical axis represents a degree of the coma aberration, and the horizontal axis represents the field angle. It can be seen from FIGS. 7A and 7B that degrees of the sperical aberration and the coma aberration are small.

Two examples of dimensions of the first imaging optical system 2 are shown in TABLE 2 and TABLE 3.

TABLE 2

| | | | | | | | |
|---|---|---|---|---|---|---|---|
| $r_{21}$ | 9.586 | $r'_{21}$ | 9.586 | $d_{21}$ | 1.189 | $n_{21}$ | 1.76605 |
| $r_{22}$ | 189.839 | $r'_{22}$ | 189.839 | $d_{22}$ | 23.644 | | |
| $r_{23}$ | ∞ | $r'_{23}$ | 3.179 | $d_{23}$ | 0.743 | $n_{22}$ | 1.82485 |
| $r_{24}$ | ∞ | $r'_{24}$ | ∞ | $d_{24}$ | 0.149 | | |
| $r_{25}$ | ∞ | $r'_{25}$ | −3.636 | $d_{25}$ | 0.446 | $n_{23}$ | 1.5932 |
| $r_{26}$ | ∞ | $r'_{26}$ | ∞ | $d_{26}$ | 9.581 | | |
| $r_{27}$ | −357.159 | $r'_{27}$ | −357.159 | $d_{27}$ | 1.189 | $n_{24}$ | 1.76605 |
| $r_{28}$ | −16.348 | $r'_{28}$ | −16.348 | | | | |

$f_{2a} = 13.154$, $f_{2b1} = 3.854$, $f_{2b2} = -6.129$, $f_{2c} = 22.35$,
the expansion ratio in the main scanning direction:
$f_{2x}/f_{2a} = 1.699$.

TABLE 3

| | | | | | | | |
|---|---|---|---|---|---|---|---|
| $r_{21}$ | 9.586 | $r'_{21}$ | 9.586 | $d_{21}$ | 1.189 | $n_{21}$ | 1.76605 |
| $r_{22}$ | 189.839 | $r'_{22}$ | 189.839 | $d_{22}$ | 23.543 | | |
| $r_{23}$ | ∞ | $r'_{23}$ | 3.017 | $d_{23}$ | 0.743 | $n_{22}$ | 1.76605 |
| $r_{24}$ | ∞ | $r'_{24}$ | ∞ | $d_{24}$ | 0.089 | | |
| $r_{25}$ | ∞ | $r'_{25}$ | −3.319 | $d_{25}$ | 0.446 | $n_{23}$ | 1.51118 |
| $r_{26}$ | ∞ | $r'_{26}$ | ∞ | $d_{26}$ | 9.713 | | |
| $r_{27}$ | −357.159 | $r'_{27}$ | −357.159 | $d_{27}$ | 1.189 | $n_{24}$ | 1.76605 |
| $r_{28}$ | −16.348 | $r'_{28}$ | −16.348 | | | | |

$f_{2a} = 13.154$, $f_{2b1} = 6.955$, $f_{2b2} = -6.493$, $f_{2c} = 22.35$,
the expansion ratio in the main scanning direction:
$f_{2x}/f_{2a} = 1.699$.

In TABLES 2 and 3, $r_{21}$–$r_{28}$ are radii of curvatures of lens surfaces of the first imaging optical system 2 in the main scanning direction which appear in order from the side of the light source 1, $r'_{21}$–$r'_{28}$ are radii of curvatures of the lens surfaces thereof in the sub scanning direction which appear in order from the side of the light source 1, $d_{21}$–$d_{27}$ are surface-to-surface distances which appear in order from the side of the light source 1, $n_{21}$–$n_{24}$ are refractive indexes of lenses which appear in order from the side of the light source 1 (for 780 nm of a light-emitting wavelength of the laser diode array LDA), and $f_{2a}$, $f_{2b1}$, $f_{2b2}$ and $f_{2c}$ are focal lengths of the lenses 2a, 2b1, 2b2 and 2c, respectively.

Figures 8A, 8B:
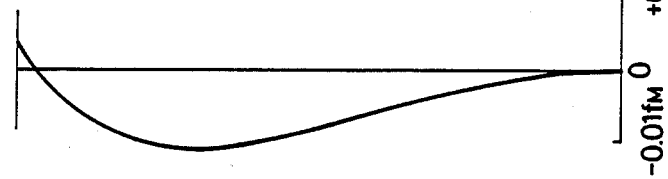
FIGS. 8A and 8B show a spherical aberration curve and a coma aberration curve respectively, in the sub scanning direction with respect to the second imaging optical system 13A having dimensions shown in TABLE 1 in a case when the first imaging optical system 2 having dimensions shown in TABLE 2 is used.

FIGS. 8A and 8B show a spherical aberration curve and a coma aberration curve, respectively, in the sub scanning direction with respect to the second imaging optical system 13A having dimensions shown in TABLE 1 in a case when the first imaging optical system 2 having dimensions shown in TABLE 2 is used. FIGS. 9A and 9B show a spherical aberration curve and a coma aberration curve, respectively, in the sub scanning direction with respect to the second imaging optical system 13A having dimensions shown in TABLE 1 in a case when the first imaging optical system 2 having dimensions shown in TABLE 3 is used. It can be seen from FIGS. 8A, 8B, 9A and 9B that degrees of the spherical aberration and coma aberration are small.

A description is given of another preferable embodiment of the present invention with reference to FIGS. 10 and 11. In FIGS. 10 and 11, those parts which are the same as the corresponding parts in FIG. 5, are given the same references. FIG. 11(A) shows the deflection plane, and FIG. 11(B) shows the plane perpendicular to the deflection plane.

An essential feature of the embodiment of FIGS. 10 and 11 is that a first imaging optical system 20 is made up of spherical lenses 2a and 2c each having a positive refracting power, and a cylindrical lens 2b interposed therebetween.

Referring to FIG. 11, two parallel beams emitted from the light source 1 are once imaged at the position A in both the main and sub scanning directions. Then due to the function of the cylindrical lens 2b and the spherical lens 2c, in the sub scanning direction, each imaged spot at the position A is imaged again in the vicinity of the deflection/reflection surface 4, as shown in FIG. 11(B). On the other hand, in the main scanning direction, the cylindrical lens 2b has the refracting power in the plane perpendicular to the deflection plane, but do not have the refracting power in the deflection plane. With this structure, in the main scanning direction, the beams leaving the first imaging optical system 20 become collimated beams. As a result, an image of each beam formed by the first imaging optical system 20 is a line image parallel to the main scanning direction. That is, the first imaging optical system 20 is afocal in the deflection plane, and images each flux from the collimator lens 11 into a line in the plane perpendicular to the deflection plane. At this time, there is no conjugate relationship between the exit pupil surface of the collimator lens 11 and the deflection/reflection surface 4 of the rotary polygon mirror 3.

The second imaging optical system 13A is the same as that shown in FIG. 5.

In the case when the second imaging optical system 13A having dimensions shown in TABLE 1 is used, it is preferable to use the first imaging optical system 20 having dimensions shown in TABLE 4.

TABLE 4

| | | | | | | | | |
|---|---|---|---|---|---|---|---|---|
| $r_{11}$ | 9.586 | $r'_{11}$ | 9.586 | $d_{11}$ | 1.189 | $n_{11}$ | 1.76605 |
| $r_{12}$ | 189.839 | $r'_{12}$ | 189.839 | $d_{12}$ | 22.888 | | |
| $r_{13}$ | ∞ | $r'_{13}$ | 4.265 | $d_{13}$ | 1.189 | $n_{12}$ | 1.5118 |
| $r_{14}$ | ∞ | $r'_{14}$ | ∞ | $d_{14}$ | 10.386 | | |
| $r_{15}$ | −357.159 | $r'_{15}$ | −357.159 | $d_{15}$ | 1.189 | $n_{13}$ | 1.76605 |
| $r_{16}$ | −16.348 | $r'_{16}$ | −16.348 | | | | |

$f_{2a} = 13.154$, $f_{2b} = 8.343$, $f_{2c} = 22.35$, the expansion ratio in the main scanning direction: $f_{2b}/f_{2a} = 1.699$.

In TABLE 4, $r_{11}$–$r_{16}$ are radii of curvatures of lens surfaces of the first imaging optical system 20 in the main scanning direction which appear in order from the side of light source 1, $r'_{11}$–$r'_{16}$ are radii of curvatures of the lens surfaces thereof in the sub scanning direction which appear in order from the side of the light source 1, $d_{11}$–$d_{15}$ are surface-to-surface distances which appear in order from the side of the light source 1, $n_{11}$–$n_{13}$ are refractive indexes of lenses which appear in order from the side of the light source 1 (for 780 nm of a light-emitting wavelength of the laser diode array LDA), and $f_{2a}$, $f_{2b}$, and $f_{2c}$ are focal distances of the lenses 2a, 2b, and 2c, respectively.

FIGS. 12A and 12B show a spherical aberration curve and a coma aberration curve, respectively, in the sub scanning direction with respect to the first imaging optical system 20 having dimensions shown in TABLE 4. As can be seen from comparison between FIGS. 8A and 12A, that the spherical aberration for dimensions of TABLE 4 has a negative value larger than that for dimensions of TABLE 1. However, it is possible to select dimensions shown in TABLE 4 as an optical scanning system in a case where the system is designed so as to use a large diameter of an imaged spot and a low pixel density scan in which a large scanning line interval Ps is large.

Another example of dimensions of the embodiment shown in FIGS. 10 and 11 is shown in TABLE 5.

TABLE 5

| | | | | | | | | |
|---|---|---|---|---|---|---|---|---|
| $r_{11}$ | 6.724 | $r'_{11}$ | 6.724 | $d_{11}$ | 1.19 | $n_{11}$ | 1.51118 |
| $r_{12}$ | ∞ | $r'_{12}$ | ∞ | $d_{12}$ | 22.83 | | |
| $r_{13}$ | ∞ | $r'_{13}$ | 4.269 | $d_{13}$ | 1.19 | $n_{12}$ | 1.51118 |
| $r_{14}$ | ∞ | $r'_{14}$ | ∞ | $d_{14}$ | 10.31 | | |
| $r_{15}$ | ∞ | $r'_{15}$ | ∞ | $d_{15}$ | 1.19 | $n_{13}$ | 1.51118 |
| $r_{16}$ | −11.425 | $r'_{16}$ | −11.425 | | | | |

$f_{2a} = 13.154$, $f_{2b} = 8.351$, $f_{2c} = 22.35$, the expansion ratio in the main scanning direction: $f_{2b}/f_{2a} = 1.699$.

In TABLE 5, $r_{11}$–$r_{16}$ are radii of curvatures of lens surfaces of the first imaging scanning system 20 in the main scanning direction which appear in order from the side of the light source 1, $r'_{11}$–$r'_{16}$ are radii of curvatures of lens surfaces thereof in the sub scanning direction which appear in order from the side of the light source 1, $d_{11}$–$d_{15}$ are surface-to-surface distances which appear in order from the side of the light source 1, $n_{11}$–$n_{13}$ are refractive indexes of lenses which appear in order from the side of the light source 1 (for 780 nm of a light-emitting wavelength of the laser diode array LDA), and $f_{2a}$, $f_{2b}$, and $f_{2c}$ are focal distances of the lenses 2a, 2b, and 2c, respectively.

In the case when the first imaging optical system 20 having dimensions shown in TABLE 5 is used, it is preferable to use the second imaging optical system 13A of an fθ lens having dimensions shown in TABLE 6.

TABLE 6

| | | | | | | | | |
|---|---|---|---|---|---|---|---|---|
| $r_1$ | −20.993 | $r_1'$ | −20.993 | $d_1$ | 2.23 | $n_1$ | 1.51118 |
| $r_2$ | ∞ | $r_2'$ | 13.515 | $d_2$ | 2.23 | | |
| $r_3$ | −65.406 | $r_3'$ | −65.406 | $d_3$ | 3.12 | $n_2$ | 1.51118 |
| $r_4$ | −31.812 | $r_4'$ | −31.812 | $d_4$ | 1.04 | | |
| $r_5$ | −38.062 | $r_6'$ | −10.526 | | | | |

$f_M = 100$, $f_S = 20.1$, $d_0 = 11.45$, $\beta = 4.48$

In TABLE 6, $r_1$–$r_6$ are radii of curvatures of lens surfaces of the second imaging optical system 13A in the main scanning direction which appear in order from the side of the reflection/deflection surface 4, and $r_1'$–$r_6'$ are radii of curvatures of lens surfaces thereof in the sub scanning direction which appear in order from the side of the deflection/reflection surface 4. Further, $d_1$–$d_5$ are surface-to-surface distances which appear in order from the side of the deflection/reflection surface 4, and $n_1$–$n_3$ are refractive indexes of lenses which appear in order from the side of the deflection/reflection surface 4 (for 780 nm of a light-emitting wavelength of the laser diode array LDA). Moreover, $f_M$ and $f_S$ are focal lengths of the second imaging optical system 13A in the main and sub scanning directions, respectively. Furthermore, $\beta$ is a lateral magnification in the nearly conjugate relationship between the deflection/reflection surface 4 and the scanned surface 8 in the sub scanning direction, and $d_0$ is a distance between the deflection/reflection surface 4 and the lens surface of the single lens 5 opposite to the polygon mirror 3.

In this case, the scanning line interval Ps is set equal to 60 μm to 70 μm, and the angle θ with respect to the laser diode array LDA is 1 to 2 degrees.

As described above, according to the present invention, a plurality of collimated beams are expanded in the main scanning direction by the function of the first imaging optical system 2 or 20 and, on the other hand, are focused in the sub scanning direction in the vicinity of the reflection/deflection surface 4. Thereby, it becomes possible to separately adjust the side of the imaged spot on the scanned surface 8 in the main and sub scanning directions. As a result, it becomes possible to certainly obtain a desired spot shape with ease.

In the former embodiment of the present invention shown in FIGS. 5 and 6, it is alternatively possible to arrange the spherical lenses 2a and 2c, and the cylindrical lenses 2b1 and 2b2 in this order from the side of the light source 1. However, in this case, the beams emitted from the light source 1 pass through the cylindrical lenses 2b1 and 2b2 after being expanded. As a result, the first imaging optical system 2 must be designed to have an increased optical length, and an increased effective diameter of each of the cylindrical lenses 2b1 and 2b2. For these reasons, it is not preferable to use the above-mentioned arrangement of parts of the first imaging optical system.

This holds true for the first imaging optical system 20 of the latter embodiment of the present invention shown in FIGS. 10 and 11. That is, it is possible to arrange the spherical lenses 2a and 2c, and the cylindrical lens 2b in this order from the light source 1. However, in this case, the beams emitted from the light source 1 pass through the cylindrical lens 2b after being expanded. As a result, the first imaging optical system 20 must be designed to have an increased optical length, and an increased effective diameter of each of the cylindrical lens 2b. For these reasons, it is not preferable to use the above-mentioned arrangement of parts of the first imaging optical system.

The embodiment shown in FIGS. 5 and 6 can provide a higher write density compared with the embodiment of FIGS. 10 and 11, because it is capable of more suitably adjusting a focused state of fluxes. In the embodiments of FIGS. 5, 6, 10 and 11, it is possible to correct the spherical aberration in the sub scanning direction by using the first imaging optical system 2, so that a load on the second imaging optical system 13A can be reduced, and can be adjusted more easily. In addition, high processability and low cost can be attained, since each cylindrical lens has curvature on a single side thereof.

In the embodiment of FIGS. 5 and 6, even if the imaging position A has a positional error, a desired spot diameter can be obtained by adjusting the spherical lens 2c in the main scanning direction, and adjusting the cylindrical lenses 2b1 and 2b2.

The present invention is not limited to the above-mentioned embodiments, and variations and modifications may be made without departing from the scope of the present invention.

What is claimed is:

1. An optical scanning system using a laser diode array comprising:
    collimating means for collimating a plurality of beams emitted from said laser diode array;
    first imaging optical means being afocal in a deflection plane for imaging said beams emitted from the collimating means into respective lines in a plane perpendicular to the deflection plane;
    deflecting means having a deflection/reflection surface, for deflecting beams from said first imaging optical means; and
    second imaging optical means for focusing beams from the deflecting means on a scanned surface,
    said first imaging optical means comprising, in the following order from the side of said collimating means toward said deflecting means, a first spherical lens having a positive refracting power; a first cylindrical lens having a positive refracting power in the plane perpendicular to the deflection plane and a lens surface thereof having a curvature opposite to said collimating means; a second cylindrical lens having a negative refracting power in the plane perpendicular to the deflection plane and a lens surface thereof having a curvature opposite to said collimating means; and a second spherical lens having a positive refracting power.

2. An optical scanning system as claimed in claim 1, wherein there is no conjugate relationship between an exit pupil surface of said collimating means and said deflection/reflection surface of said deflecting means, and there is substantially formed in the plane perpendicular to the deflection plane, a nearly conjugate relationship between an image point of said first spherical lens and the deflection/reflection surface of said deflecting means.

3. An optical scanning system as claimed in claim 1, wherein said second imaging optical means couples, in the plane perpendicular to the deflection plane, said deflection/reflection surface with said scanned surface so that there is formed a nearly conjugate relationship therebetween.

4. An optical scanning system using a laser diode array comprising:
    collimating means for collimating a plurality of beams emitted from said laser diode array;
    first imaging optical means being afocal in a deflection plane for imaging said beams emitted from the collimating means into respective lines in a plane perpendicular to the deflection plane;
    deflecting means having a deflection/reflection surface, for deflecting beams from said first imaging optical means; and
    second imaging optical means for focusing beams from the deflecting means on a scanned surface,
    said first imaging optical means comprising, in the following order from the side of said collimating means toward said deflecting means, a first spherical lens having a positive refracting power; a cylindrical lens having a positive refracting power in the plane perpendicular to the deflection plane; and a second spherical lens having a positive refracting power.

5. An optical scanning system as claimed in claim 4, wherein there is no conjugate relationship between an exit pupil surface of said collimating means and said deflection/reflection surface of said deflecting means, and there is substantially formed in the plane perpendicular to the deflection plane, a nearly conjugate relationship between an image point of said first spherical lens and the deflection/reflection surface of said deflecting means.

6. An optical scanning system as claimed in claim 4, wherein said second imaging optical means couples, in the plane perpendicular to the deflection plane, said deflection/reflection surface with said scanned surface so that there is formed a nearly conjugate relationship therebetween.

* * * * *